(12) United States Patent
Ko et al.

(10) Patent No.: US 10,223,910 B2
(45) Date of Patent: Mar. 5, 2019

(54) METHOD AND APPARATUS FOR COLLECTING TRAFFIC INFORMATION FROM BIG DATA OF OUTSIDE IMAGE OF VEHICLE

(71) Applicant: Korea University Research and Business Foundation, Seoul (KR)

(72) Inventors: Han Seok Ko, Seoul (KR); Du Bok Park, Seoul (KR); Cheol Jong Yang, Jeju-do (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/465,819

(22) Filed: Mar. 22, 2017

(65) Prior Publication Data

US 2017/0278386 A1    Sep. 28, 2017

(30) Foreign Application Priority Data

Mar. 22, 2016    (KR) .................. 10-2016-0033894

(51) Int. Cl.
| | |
|---|---|
| G08G 1/01 | (2006.01) |
| G06K 9/00 | (2006.01) |
| G06K 9/62 | (2006.01) |
| G06F 17/30 | (2006.01) |
| G06N 99/00 | (2010.01) |
| G08G 1/04 | (2006.01) |

(Continued)

(52) U.S. Cl.
CPC ....... *G08G 1/0112* (2013.01); *G06F 17/3087* (2013.01); *G06F 17/30256* (2013.01); *G06K 9/00785* (2013.01); *G06K 9/6267* (2013.01); *G06N 99/005* (2013.01); *G08G 1/0129* (2013.01); *G08G 1/0133* (2013.01); *G08G 1/0141* (2013.01); *G08G 1/04* (2013.01); *G08G 1/096827* (2013.01); *G08G 1/142* (2013.01); *G08G 1/147* (2013.01)

(58) Field of Classification Search
CPC ............................ G08G 1/0112; G06K 9/00
See application file for complete search history.

(56) References Cited

U.S. PATENT DOCUMENTS

| | | | | |
|---|---|---|---|---|
| 7,283,646 | B2 * | 10/2007 | Tamoto ................. | H04N 7/188 348/143 |
| 8,619,135 | B2 * | 12/2013 | Shellshear ............. | H04N 7/18 348/135 |

(Continued)

*Primary Examiner* — Alex C Dunn
(74) *Attorney, Agent, or Firm* — Fox Rothschild LLP (57) ABSTRACT

Provided is a traffic information collecting method using big data of an outside image of a vehicle. According to the present disclosure, a traffic information collecting method using big data of an outside image of a vehicle includes: generating object classification information indicating information on at least one of a position, a type, and a status of at least one object included in an image obtained by photographing an external situation of a vehicle; generating situation analysis information which is information obtained by analyzing the external situation of the vehicle, based on the object classification information; and selectively transmitting the situation analysis information to a server based on whether the situation analysis information corresponds to a passage interruption event which is an incident interrupting passage of the vehicle.

13 Claims, 7 Drawing Sheets

(51) Int. Cl.
*G08G 1/0968* (2006.01)
*G08G 1/14* (2006.01)

(56) References Cited

U.S. PATENT DOCUMENTS

| | | | | |
|---|---|---|---|---|
| 8,694,236 | B2* | 4/2014 | Takagi | G01S 17/936 |
| | | | | 701/300 |
| 9,286,693 | B2* | 3/2016 | Yoo | G06T 7/2033 |
| 9,892,344 | B1* | 2/2018 | Tran | G06K 9/66 |
| 2008/0055056 | A1* | 3/2008 | Mase | G08G 1/164 |
| | | | | 340/425.5 |
| 2008/0094250 | A1* | 4/2008 | Myr | G08G 1/04 |
| | | | | 340/909 |
| 2009/0112452 | A1* | 4/2009 | Buck | G08G 1/096716 |
| | | | | 701/117 |
| 2010/0231720 | A1* | 9/2010 | Tucker | G06K 9/00785 |
| | | | | 348/149 |
| 2012/0033123 | A1* | 2/2012 | Inoue | G08G 1/04 |
| | | | | 348/333.13 |
| 2014/0046509 | A1* | 2/2014 | Otake | G08G 1/095 |
| | | | | 701/2 |
| 2015/0294422 | A1* | 10/2015 | Carver | G06Q 40/08 |
| | | | | 705/4 |
| 2015/0348411 | A1* | 12/2015 | Inoue | G08G 1/04 |
| | | | | 348/149 |
| 2016/0253883 | A1* | 9/2016 | Westmacott | H04N 7/181 |
| | | | | 348/159 |
| 2017/0060904 | A1* | 3/2017 | Pau | G06F 17/30268 |
| 2017/0269602 | A1* | 9/2017 | Nakamura | G05D 1/0214 |

* cited by examiner

METHOD AND APPARATUS FOR COLLECTING TRAFFIC INFORMATION FROM BIG DATA OF OUTSIDE IMAGE OF VEHICLE

CROSS-REFERENCE TO RELATED APPLICATIONS

This application claims the priority of Korean Patent Application No. 10-2016-0033894 filed on Mar. 22, 2016, in the Korean Intellectual Property Office, the disclosure of which is incorporated herein by reference.

BACKGROUND

Field

The present disclosure relates to a method and an apparatus for collecting traffic information using big data of an image which is photographed toward the outside of a vehicle.

Description of the Related Art

Recently, as development of a GPS technology and spread of portable wireless devices are rapidly increasing, a traffic information guidance system which applies the technologies is also developing. A typical traffic information guidance system collects a congestion status for each road using GPS information of a vehicle of a user or a portable wireless device, updates the traffic information, and then provides the traffic information to the user. For example, a navigation system of the related art provides a shortest distance to the driver based on a route and a fixed driving time stored in a navigation device. In contrast, a recent navigation system provides a shortest distance to which actual traffic information is reflected to the driver.

However, the real-time navigation system typically provides only information related to the driving time along a driving route. That is, when a congestion occurs on a specific road, it is difficult to identify a cause of a road congestion such as a congestion due to simple increase in a traffic volume, a congestion due to an accident, or a congestion due to road construction. The above-described navigation system updates the information at the time when the congestion result occurs so that it is difficult to provide information on a congestion due to a sudden accident in real time.

Accordingly, there is a need for a method and an apparatus for collecting traffic information using big data of an image obtained by photographing the outside of the vehicle in order to more promptly update road traffic information and provide the traffic information to the driver.

Related technologies are disclosed in Korean Unexamined Patent Application Publication No. 10-2014-0100611 (entitled operating method of route guidance system and route guidance method of portable device, published on Aug. 18, 2014).

SUMMARY

The present disclosure has been made in an effort to provide a method and an apparatus which analyze big data of an image obtained by photographing the outside of the vehicle using a deep learning algorithm and interpret an external situation of a road using the analysis result.

Further, the present disclosure has been made in an effort to provide a method and an apparatus which automatically collect traffic information from the external situation of the road without an artificial input of a user.

According to an aspect of the present disclosure, a traffic information collecting method using big data of an outside image of a vehicle includes: generating object classification information indicating information on at least one of a position, a type, and a status of at least one object included in an image obtained by photographing an external situation of a vehicle; generating situation analysis information which is information obtained by analyzing the external situation of the vehicle, based on the object classification information; and selectively transmitting the situation analysis information to a server based on whether the situation analysis information corresponds to a passage interruption event which is an incident interrupting passage of the vehicle.

The generating of object classification information may be performed based on a deep learning algorithm.

The situation analysis information may include information on at least one of a type, a cause, details, an image, an expected duration, and a place of occurrence of the external situation.

When in the generating of situation analysis information, a lane interruption ratio which is a ratio between the number of lanes on which the passage of the vehicle is interrupted due to the external situation and the total number of lanes and an expected duration until the external situation is settled are included in the situation analysis information, in the selectively transmitting of the situation analysis information to a server, it may be determined whether the situation analysis information corresponds to the passage interruption event based on at least one of the lane interruption ratio and the expected duration included in the situation analysis information.

The method may further include: obtaining an image obtained by photographing an external situation of the vehicle from a camera mounted in the vehicle; and performing a pre-processing for improving an image quality of the image, in which in the generating of object classification information, the image on which the pre-processing is performed may be used.

The transmitted situation analysis information may be relayed to a plurality of clients registered in the server to be used to search for a route of a navigation interlocked with each of the plurality of clients.

With regard to the situation analysis information, a reliability of the situation analysis information may be determined based on the number of times that the situation analysis information for the same external situation occurring at the same place is transmitted to the server.

When in the generating of object classification information, facility sales information indicating real-time sales information of at least one driver's convenience facility included in the image is further generated and in the generating of situation analysis information, the situation analysis information which further includes the facility sales information is generated, in the selectively transmitting of the situation analysis information to a server, when the situation analysis information includes the facility sales information, the situation analysis information may be transmitted to the server regardless of whether the situation analysis information corresponds to the passage interruption event.

Further, according to another aspect of the present disclosure, a traffic information collecting apparatus using big data of an outside image of a vehicle includes: a classifying unit which generates object classification information indicating information on at least one of a position, a type, and a status of at least one object included in an image obtained by photographing an external situation of a vehicle; an analyzing unit which generates situation analysis information which is information obtained by analyzing the external situation of the vehicle, based on the object classification information; a determining unit which determines whether the situation analysis information corresponds to a passage interruption event which is an incident interrupting passage of the vehicle; and a transmitting unit which selectively transmits the situation analysis information to a server based on a determination result.

The classifying unit may generate the object classification information based on a deep learning algorithm.

The situation analysis information may include information on at least one of a type, a cause, details, an image, an expected duration, and a place of occurrence of the external situation.

When the analyzing unit includes a lane interruption ratio which is a ratio between the number of lanes on which the passage of the vehicle is interrupted due to the external situation and the total number of lanes and an expected duration until the external situation is settled in the situation analysis information, the determining unit may determine whether the situation analysis information corresponds to the passage interruption event based on at least one of the lane interruption ratio and the expected duration included in the situation analysis information.

The apparatus may further include an obtaining unit which obtains an image obtained by photographing an external situation of the vehicle from a camera mounted in the vehicle; and a pre-processing unit which performs a pre-processing for improving an image quality of the image, in which the classifying unit may use the image on which the pre-processing is performed.

The transmitted situation analysis information may be relayed to a plurality of clients registered in the server to be used to search for a route of a navigation interlocked with each of the plurality of clients.

When the classifying unit further generates facility sales information indicating real-time sales information of at least one driver's convenience facility included in the image, the analyzing unit generates the situation analysis information which further includes the facility sales information, and the determining unit further determines whether the situation analysis information includes the facility sales information, the transmitting unit may transmit the situation analysis information to the server regardless of the determination result on whether the situation analysis information corresponds to the passage interruption event, according to the determination result on whether the facility sales information is included.

According to the present disclosure, it is possible to analyze big data of an image obtained by photographing the outside of the vehicle using a deep learning algorithm and interpret an external situation of a road using the analysis result.

Further, according to the present disclosure, it is possible to automatically collect traffic information from an external situation of a road without a separate input of a user.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Those skilled in the art may make various modifications to the present disclosure and the present disclosure may have various embodiments thereof, and thus specific embodiments will be illustrated in the drawings and described in detail in detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar components.

Terms such as first, second, A or B may be used to describe various components but the components are not limited by the above terminologies. The above terminologies are used only to discriminate one component from the other component. For example, without departing from the scope of the present disclosure, a first component may be referred to as a second component, and similarly, a second component may be referred to as a first component. A term of "and/or" includes combination of a plurality of related elements or anyone of the plurality of related elements.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween.

Terms used in the present application are used only to describe specific exemplary embodiments, and are not intended to limit the present disclosure. A singular form may include a plural form if there is no clearly opposite meaning in the context. In the present disclosure, it should be understood that term "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present disclosure will be described in detail with reference to accompanying drawings.

Figure 1:
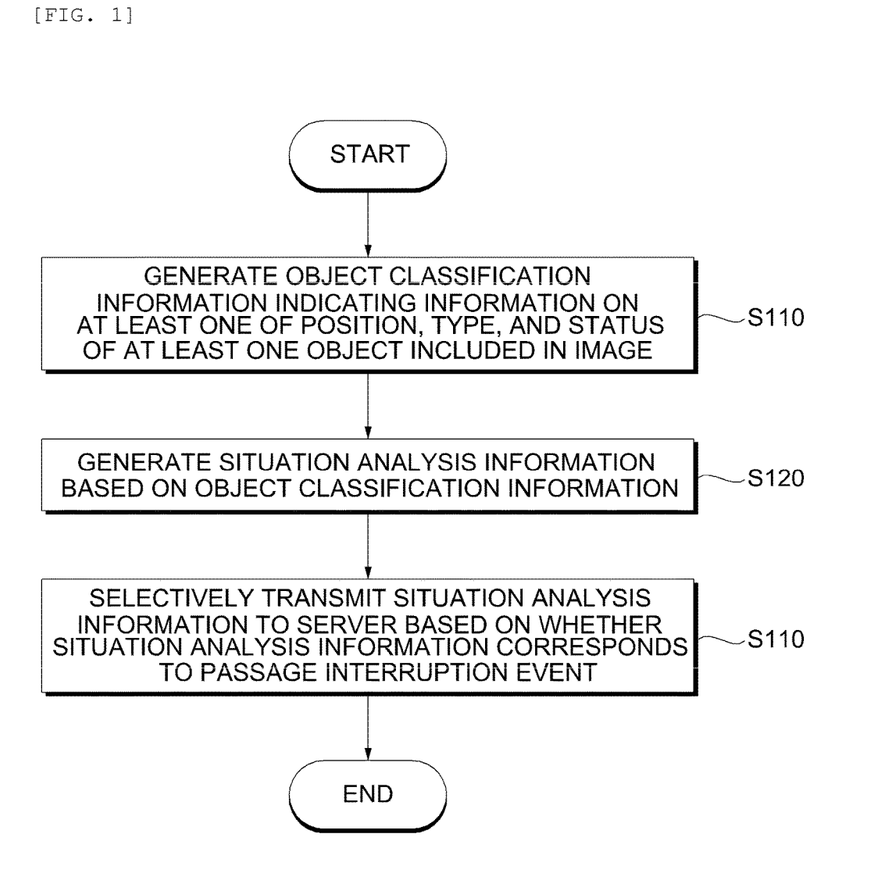
FIG. 1 is a flowchart provided to explain a traffic information collecting method using big data of an outside image of a vehicle according to an exemplary embodiment of the present disclosure.

FIG. 1 is a flowchart provided to explain a traffic information collecting method using big data of an outside image of a vehicle according to an exemplary embodiment of the present disclosure.

In step S110, the traffic information collecting apparatus generates object classification information indicating information on at least one of a position, a type, and a status of at least one object included in an image obtained by photographing an external situation of a vehicle.

In the present disclosure, a vehicle collectively refers to a transportation device which drives on a road. For example, vehicles, street cars (trams), bicycles, and motorcycles may be vehicles but the vehicles are not limited thereto.

The image obtained by photographing the external situation of the vehicle may be a still image or a moving image. In the case of the moving image, a partial scene of the entire moving image may be used. Further, the image may be an image obtained by photographing the outside of the vehicle by a camera or a photographic device mounted in the vehicle. The camera or the photographic device may be included in the traffic information collecting apparatus or independently provided to transmit the photographed image to the traffic information collecting apparatus in a wired or wireless manner.

Further, the external situation of the vehicle may be an external situation in the front of a forward driving direction of the vehicle. However, it is not limited thereto, but may be an external situation of left and right sides or a backward direction of the vehicle.

In the meantime, the traffic information collecting apparatus may be mounted in a driver information system of a vehicle, a black box (an image recording device) for a vehicle, a navigation system for a vehicle, a smart phone, a tablet, or a computer. For example, the black box (an image recording device) for a vehicle may include both a traffic information collecting apparatus and a photographic device connected to the traffic information collecting apparatus. Further, the driver information system of the vehicle may include the traffic information collecting apparatus and the traffic information collecting apparatus may receive the photographed image from a camera which is separately provided in the vehicle in a wired manner. Further, a remote computer may include the traffic information collecting apparatus and the traffic information collecting apparatus may receive the photographed image from a camera which is provided in the vehicle wirelessly.

The object classification information may be generated so as to include information on at least one of a position, a type, and a status for each of the objects using information such as a pixel value of a pixel included in the photographed image. Here, the object is an object included in the photographed image and may be a vehicle, a person, an animal, a natural object (a roadside tree, a river, or sky), and an artificial facility (a traffic light, a traffic sign, a mail box, or a median strip).

First, the position of the object refers to a relative position of the object in the photographed image and may be used when considering a positional relationship with other object and a positional relationship with a background such as a road and a sidewalk (for example, a lane where the vehicle is located).

Second, the type of object may be the vehicle, the person, the animal, the natural object, and the artificial facility which have been described above. However, even the same type of objects may be recognized as different types of objects in detail. For example, when the vehicle is included in the photographed image, all vehicles in the photographed image may not be recognized as the same type of objects. That is, the vehicles may be recognized as the different types of objects according to models (a model A or a model B) and types (a motorcycle, a truck, a bus, a sedan, and an SUV) of the vehicles. Further, when a person is included in the photographed image, the person is classified into an adult, a child, and an elderly to be recognized as different types of objects. Furthermore, when a facility is included in the photographed image, the facility is classified into a traffic sign, a traffic light, and a median strip to be recognized as different types of objects.

Third, the status of the object may refer to an exterior status of the object. For example, even though the objects are the same type of vehicles, when one vehicle is normal but the other vehicle has a damaged front bumper, the vehicles may be recognized as objects in different status. Furthermore, for the same type of person objects, a normal person and a bleeding person may be recognized as objects in different status. Furthermore, for the same type of building objects, a normal building and a building which is surrounded by a flame may be recognized as objects in different status.

In the meantime, a specific object classification information generating method will be described in detail below with reference to FIGS. 2 and 3.

In step S120, the traffic information collecting apparatus generates situation analysis information which is information obtained by analyzing the external situation of the vehicle based on the generated object classification information.

The situation analysis information refers to information obtained by analyzing an external situation included in the photographed image and the traffic information collecting apparatus may generate the situation analysis information using the generated object classification information.

For example, when the object classification information includes information on the vehicle with a damaged bumper and information on a person lying on the road while bleeding, the traffic information collecting apparatus may generate situation analysis information including contents about a traffic accident from the object classification information. Further, when the object classification information includes information on a building surrounded by flames and information on emergency vehicles (ambulances or fire trucks) parked on the roadside, the traffic information collecting apparatus may generate situation analysis information including contents about the fire from the object classification information.

According to another exemplary embodiment, the situation analysis information may include information on at least one of a type, a cause, content, an image, an expected duration, and a place of occurrence of the external situation.

For example, the type of external situation may be any one of a normal situation, a traffic accident, fire, construction, weather (hail, snow, or rain), and other situation (road breakage or freight falling). Further, the cause of the external situation may be collision between vehicles in the case of the traffic accident, fire in a roadside building in the case of the fire, a road pavement work in the case of construction, and big snowflakes or heavy rain in the case of weather. Further, the contents of the external situation may be an injured person who lies on the road and bleeds and a vehicle with a damaged bumper located on the road in the case of the traffic accident and the roadside building surrounded by the frames and the fire truck and the ambulance parked on the roadside in the case of the fire. Further, the image of the external situation may be a photographed image including the external situation. Furthermore, the expected duration of the external situation may be determined in advance according to the type and the contents of the external situation and may be a time expected that the external situation may be lasted. Furthermore, as for the place of the occurrence of the external situation, coordinate information of the vehicle received from a GPS mounted in the vehicle may be used.

Finally, in step S130, the traffic information collecting apparatus selectively transmits situation analysis information to a server based on whether the situation analysis information corresponds to a passage interruption event which interrupts passage of the vehicle.

The passage interruption event is an event which occurs on a road or in the vicinity of the road and is determined to interrupt the passage of the vehicle that passes the road. For example, the passage interruption event may include the traffic accident, the fire, the construction, and severe weather.

When it is determined that the situation analysis information corresponds to the passage interruption event, the traffic information collecting apparatus may transmit the situation analysis information to a server for collecting and storing the traffic information. In this case, the traffic information collecting apparatus may be connected to the server by a wired or wireless communication unit such as 3G, LTE, or an LAN. However, when the situation analysis information does not correspond to the passage interruption event, that is, it is determined that the situation analysis information does not interrupt the passage of the vehicle, the traffic information collecting apparatus may not transmit the situation analysis information to the server.

According to another exemplary embodiment, the traffic information collecting apparatus may determine whether the situation analysis information corresponds to the passage interruption event, based on at least one of a lane interruption ratio and the expected duration included in the situation analysis information, and transmit the determination result to the server. The traffic information collecting apparatus may generate the situation analysis information so as to include the lane interruption ratio and the expected duration for the external situation.

The lane interruption ratio is a ratio between the number of lanes on which the passage of the vehicle is interrupted due to the external situation and the total number of lanes. For example, the traffic information collecting apparatus may calculate the number of lanes on which the passage is interrupted, from the number of lanes occupied by a vehicle which is damaged or fired, the number of lanes where the injured person or the emergency vehicle is located, or the number of lanes which are blocked due to the construction, based on the position information for every object. A ratio between the number of lanes on which the passage is interrupted and the total number of lanes may be calculated as a lane interruption ratio. When a traffic accident occurs on a four-lane road and an accident vehicle is located in a third lane and an injured person lies on a second lane, the lane interruption ratio may be 2/4=50%.

The expected duration may be an expected time until the external situation is settled. For example, according to whether the emergency vehicle (a police car, a fire truck, an ambulance, and a tow truck) arrives, the traffic information collecting apparatus may calculate the expected duration using an average dispatch time of the emergency vehicle and an average settlement time which is a time until the external situation is settled by the emergency vehicle according to the type (for example, the traffic accident or the fire) of the external situation.

For example, when the lane interruption ratio included in the situation analysis information is equal to or higher than 30% and the expected duration is equal to or longer than 30 minutes, the traffic information collecting apparatus may determine that the situation analysis information corresponds to the passage interruption event and transmit the situation analysis information to the server.

According to another exemplary embodiment, before generating the object classification information, the traffic information collecting apparatus obtains the image obtained by photographing the external situation of the vehicle from the camera installed in the vehicle and performs a pre-processing to improve an image quality of the image.

The camera installed in the vehicle may be installed to photograph the outside of the vehicle from the inside of the vehicle. Desirably, the camera may be directed to one of a front side, a rear side, a left side, and a right side of a driving direction of the vehicle. Further, the photographing direction of the camera may be manually or automatically adjusted to a specific direction desired to photograph an object.

Further, the camera may be included as one of components of the traffic information collecting apparatus or independently provided to transmit the photographed image to the traffic information collecting apparatus in a wired or wireless manner. When the camera is independently provided, the traffic information collecting apparatus may be located in a place separated from the camera.

The pre-processing for improving an image quality of the image may include a process of removing a static or dynamic noise in a low-illuminance environment such as a nighttime or a tunnel and a process of restoring an image by applying a color mapping function model method. A process of removing a static noise which is continuously generated and a dynamic noise which is instantaneously generated may be performed by a method using a low pass (LP) filter, a median filter, a Kalman filter, or a wavelet transform. The process of restoring an image by applying a color mapping function model may be performed by a method using statistics for a color of a pixel included in two images and a method using a color of a corresponding pixel between two images.

In this case, the traffic information collecting apparatus generates the object classification information using the pre-processed image to increase accuracy and efficiency of the classification of the object.

According to another exemplary embodiment, the situation analysis information which is transmitted to the server by the traffic information collecting apparatus is relayed to a plurality of clients which is registered in the server and may be used to search for a route of the navigation which is interlocked with the plurality of clients.

Further, with regard to the situation analysis information, a reliability of the situation analysis information may be determined based on the number of times that the situation analysis information for the same external situation occurring at the same place has been transmitted to the server.

A specific method of transmitting and sharing the situation analysis information will be described in detail with reference to FIGS. 4 to 6.

According to another exemplary embodiment, when the situation analysis information includes facility sales information, the traffic information collecting apparatus may transmit the situation analysis information to the server regardless of whether the situation analysis information corresponds to the passage interruption event.

The facility sales information indicates real-time sales information of at least one driver's convenience facility included in the photographed image. The traffic information collecting apparatus may generate situation analysis information so as to include the facility sales information.

The driver's convenience facility may include gas stations, parking lots, emergency rooms, and resting areas that the driver may use while driving. For example, when the lighting of the gas station included in the photographed image is turned on to indicate that the gas station is in operation, the traffic information collecting apparatus may generate the facility sales information indicating real-time sales information indicating that the gas station is operating. Further, when the lighting of the parking lot included in the photographed image is turned off to indicate that the parking lot is not in operation, the traffic information collecting apparatus may generate the facility sales information indicating real-time sales information indicating that the parking lot is not in operation.

In the meantime, when arbitrary situation analysis information is not the passage interruption event, the traffic information collecting apparatus does not transmit the situation analysis information to the server. Even though the arbitrary situation analysis information is not the passage interruption event, when the situation analysis information includes the facility sales information, exceptionally, the traffic information collecting apparatus may transmit the situation analysis information to the server regardless of whether the situation analysis information corresponds to the passage interruption event. This is because the facility sales information has a separate purpose regardless of the passage interruption event.

As described above, the traffic information collecting method using big data of an outside image of the vehicle according to an exemplary embodiment of the present disclosure automatically collects traffic information which interrupts passage of the vehicle from the outside image obtained from the camera without separate manipulation of the user and transmits the collected traffic information to the server to share the traffic information with other clients.

Figure 2:
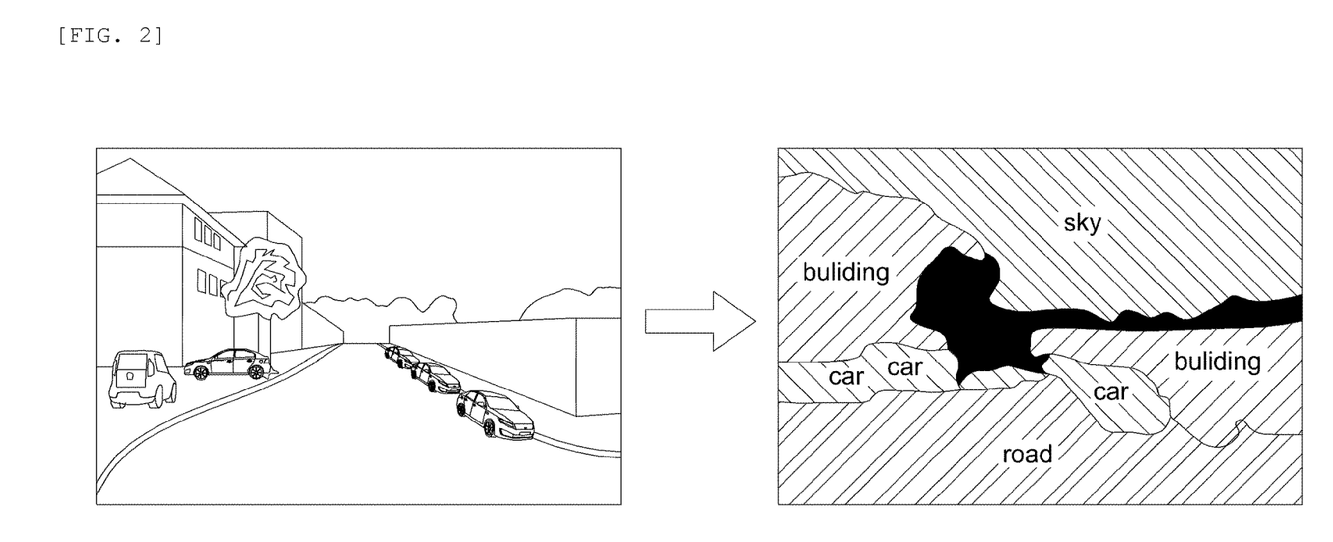
FIG. 2 is a view provided to explain a method for creating object classification information according to an exemplary embodiment of the present disclosure.

FIG. 2 is a view provided to explain a method for creating object classification information according to an exemplary embodiment of the present disclosure.

Referring to FIG. 2, it is checked that the traffic information collecting apparatus classifies objects included in the photographed image into a vehicle, a building, a road, or sky.

In this case, the process of classifying at least one object included in the photographed image to generate object classification information by means of the traffic information collecting apparatus may be performed using a deep learning algorithm.

That is, the traffic information collecting apparatus classifies at least one object included in the photographed image using the deep learning algorithm and generates object classification information including the classified information. In this case, the object classification information may include information on at least one of the position, the type, and the status of each object.

For example, when the photographed image includes one person and one vehicle on the road, an object corresponding to the person may be an adult man on a sidewalk and an object corresponding to the vehicle may be a specific model of car having an exterior status with damaged bumper on a road. The traffic information collecting apparatus may generate object classification information including information on two objects.

In the meantime, the deep learning algorithm will be described in detail with reference to FIG. 3.

Figure 3:
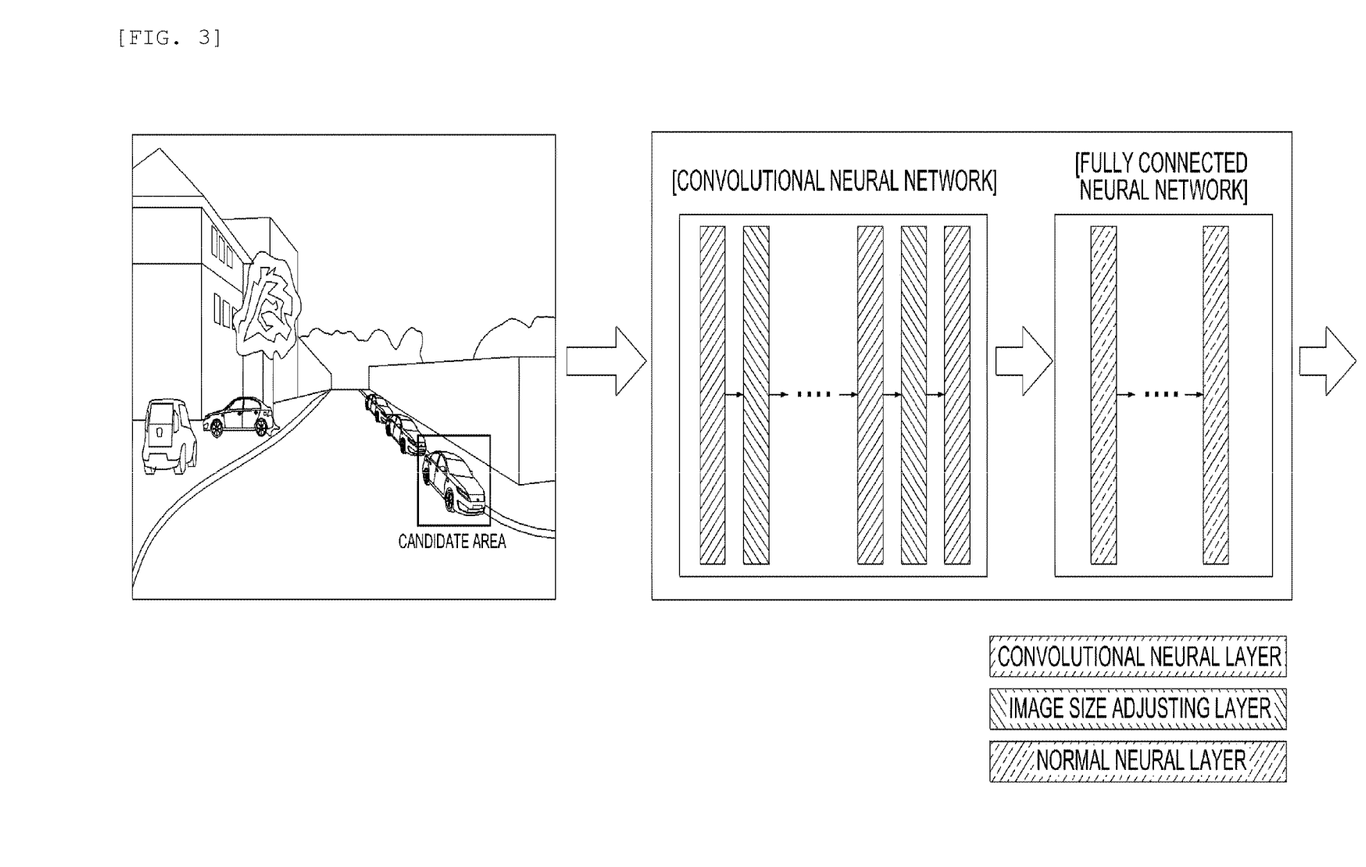
FIG. 3 is a view provided to explain a deep learning algorithm according to an exemplary embodiment of the present disclosure.

FIG. 3 is a view provided to explain a deep learning algorithm according to an exemplary embodiment of the present disclosure.

Referring to FIG. 3, the deep learning algorithm is one of learning algorithms based on multiple neural networks and may include a convolution based neural network and a fully connected neural network. The convolutional neural network is configured by a multiple connection structure of a convolutional neural layer which performs convolution operation and an image size adjusting layer which reduces a size of the image. Further, the fully connected neural network is a multiple connection structure of a general neural layer.

In this case, the number of neural layers which configure the neural networks may vary depending on the size of the image input. Generally, a convolutional neural network configured by five convolutional neural layers and four image size adjusting layers and a fully connected neural network configured by two general neural layers may be used. The convolution based neural network may perform a function of analyzing an improved image obtained by a pre-processing unit to extract a detailed feature of the image. The fully connected neural network may perform a function of determining a type of an object of the image input based on the detailed feature of the image extracted from the convolution based neural network.

Therefore, the most terminal neural layer of the fully connected neural network derives a result of one-dimensional vector form having the same size as the number of objects to be detected and determines an object having the largest result value as an analysis result. For example, when objects to be detected are four objects including a vehicle, a person, a street tree, and a traffic light and a quadrangle candidate area image is input, the deep learning algorithm derives a one-dimensional vector value with a size of 4 according to the order of the "vehicle, person, street tree, and signal light" such as "0.7, 0.1, 0.1, and 0.1". Further, finally, a first object "vehicle" having the largest value may be determined as a recognition result. In this case, the recognized objects are limited to four as an example, but when the deep learning algorithm is actually applied, a plurality of multiple objects may be recognized.

Figure 4:
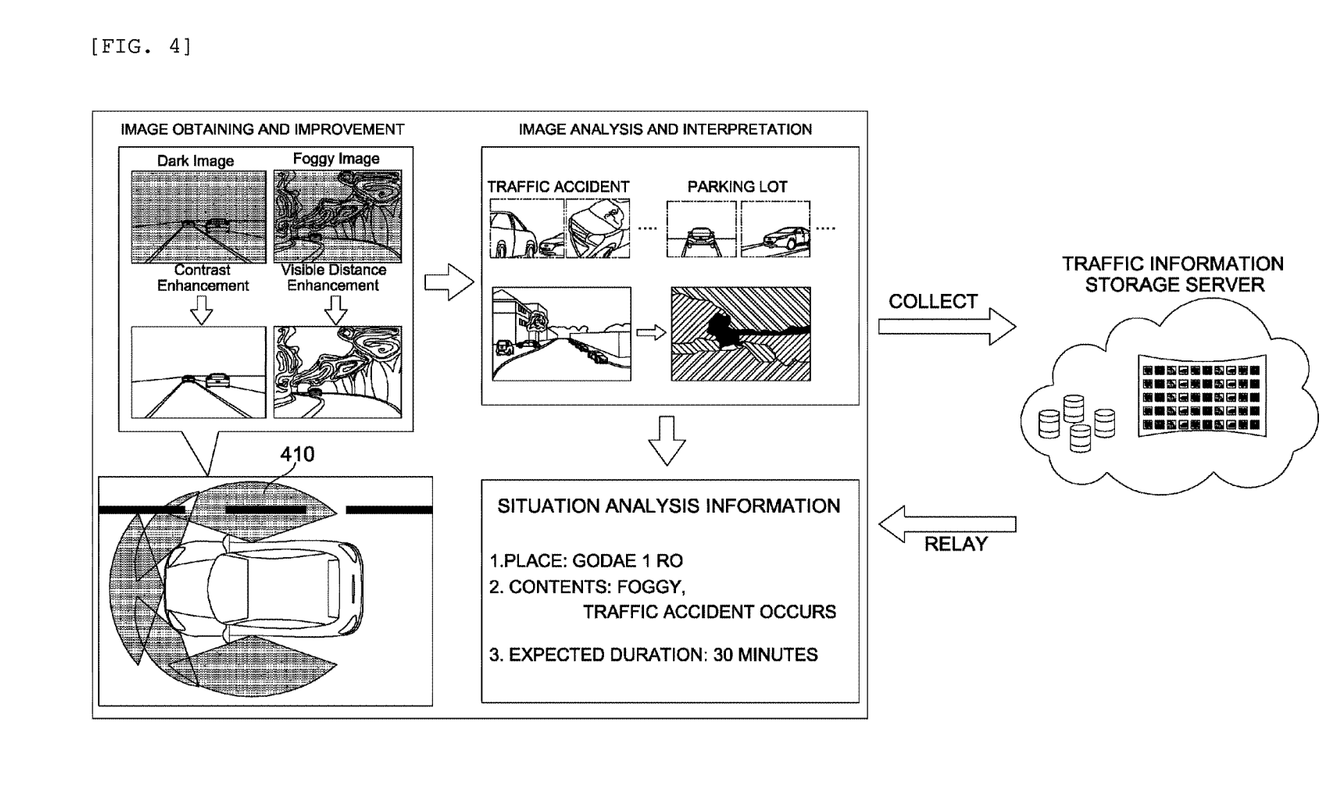
FIG. 4 is a view provided to explain a method for collecting and sharing traffic information according to an exemplary embodiment of the present disclosure.

FIG. 4 is a view provided to explain a method for collecting and sharing traffic information according to an exemplary embodiment of the present disclosure.

Referring to FIG. 4, the traffic information collecting apparatus generates the situation analysis information which is a result obtained by analyzing the external situation from the image obtained by photographing the external situation (410) using the camera mounted in the vehicle and transmits the generated situation analysis information to a traffic information storage server. Further, the situation analysis information transmitted from the traffic information storage server is relayed to the plurality of clients to be used to search for the route of the navigation.

In this case, the plurality of clients may be vehicles, but may also be a smart phone, a tablet, or a PC rather than the vehicle. For example, a bicycle driver may receive the situation analysis information from the server through the smart phone. The situation analysis information may be used to search for a route of navigation for a bicycle.

In the meantime, the situation analysis information relayed to the plurality of clients may be transmitted to a navigation interlocked with each client. The navigation may search for a vehicle driving route so as not to pass the place where an accident included in the situation analysis information occurs. Further, the navigation may provide detailed information on the type, the cause, the contents, the image, the expected duration, and the place of occurrence of the external situation included in the situation analysis information to the user of the navigation.

However, the vehicle which generates and transmits the situation analysis information is not necessarily a client which receives the situation analysis information from the traffic information storage server. Further, even though a vehicle does not generate and transmit the situation analysis information, the vehicle may become a client which receives the situation analysis information from the traffic information storage server. That is, there may be a vehicle which just transmits the situation analysis information or a client which just receives the situation analysis information.

In the meantime, a reliability of the situation analysis information transmitted from the traffic information collecting apparatus may be determined according to the number of times that the situation analysis information on the same external situation generated in the same place at the same time is transmitted to the traffic information collecting server.

For example, as the situation analysis information on the same external situation is transmitted from more vehicles for a predetermined time, the traffic information collecting apparatus may determine that the reliability of the situation analysis information is high. Only when the reliability is equal to or higher than a predetermined level, the traffic information storage server may relay the situation analysis information to the plurality of clients based on the reliability determined as described above.

Figure 5:
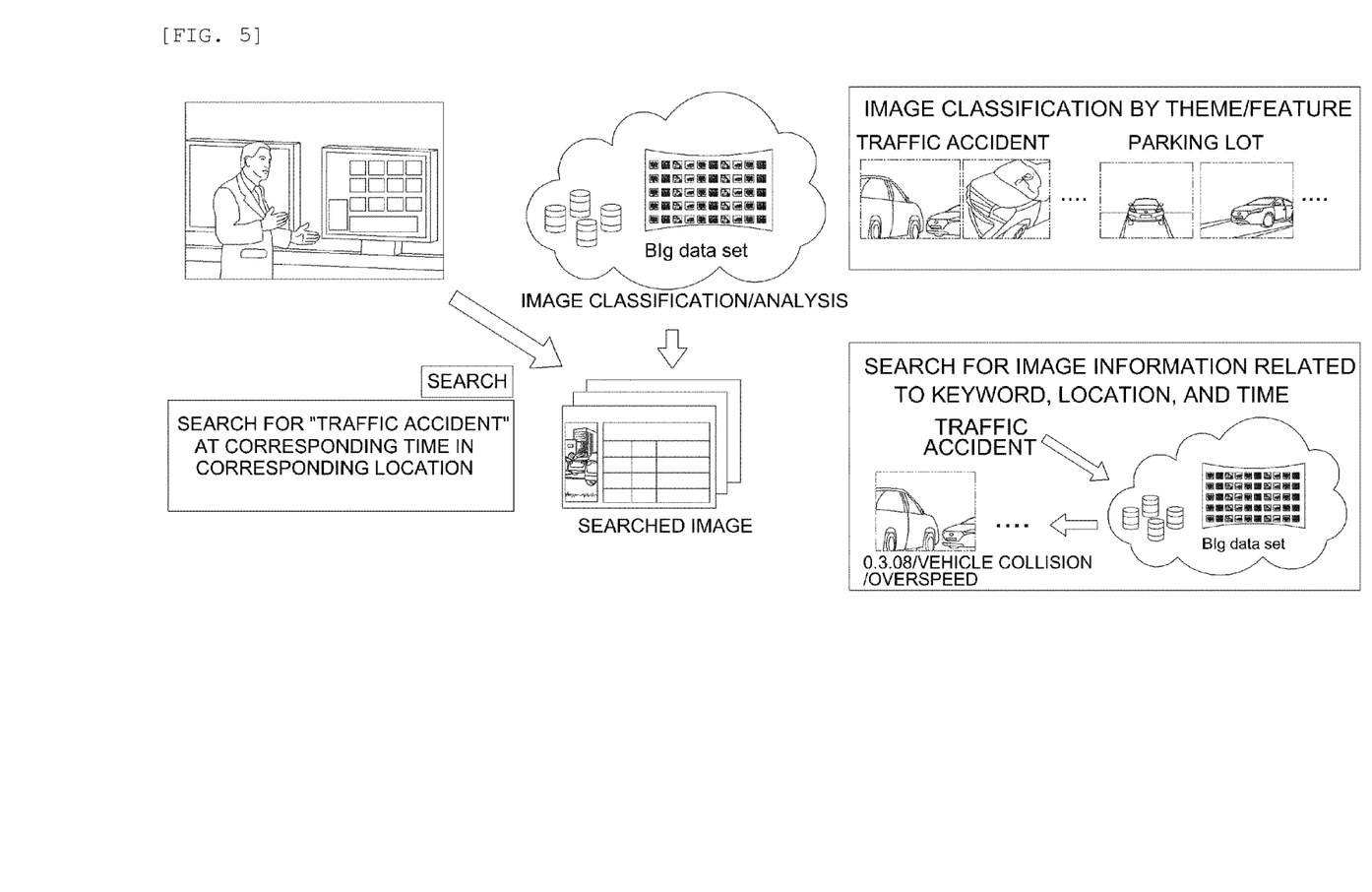
FIG. 5 is a view provided to explain a method for collecting and sharing traffic information according to another exemplary embodiment of the present disclosure.

FIG. 5 is a view provided to explain a method for collecting and sharing traffic information according to another exemplary embodiment of the present disclosure.

Referring to FIG. 5, the user may search for a related incident and accident by inputting information such as a keyword, a place, or a time to the traffic information storage server which collects the situation analysis information.

The situation analysis information may include information on at least one of a type, a cause, contents, an image, an expected duration, and a place of occurrence of the external situation. Accordingly, when the user inputs one of the keyword, the place, and the time to the traffic information storage server in which a database for the situation analysis information is built, the situation analysis information related to the input may be searched.

In this case, the keyword input by the user may be used to search for the type, the cause, and the contents of the external situation included in the plurality of stored situation analysis information. Further, the place input by the user may be used to search for the place of occurrence included in the situation analysis information. Further, the time input by the user may be used to search for information of date and time when the situation analysis information is transmitted or received.

When the search is performed by the traffic information storage server, the user may receive a list and details of the situation analysis information searched from the traffic information storage server. Further, at least one of the type, the cause, the contents, the image, the expected duration, and the place of occurrence of the external situation may be identified from the details of the situation analysis information.

In this case, since the stored situation analysis information may be used to search not only for the incident or accident currently generated on the road, but also for the incident or accident generated in the past, the stored situation analysis information may be used as a material for tracking a stolen vehicle or a criminal or identifying a cause of the traffic accident and other circumstances of the accident.

Figure 6:
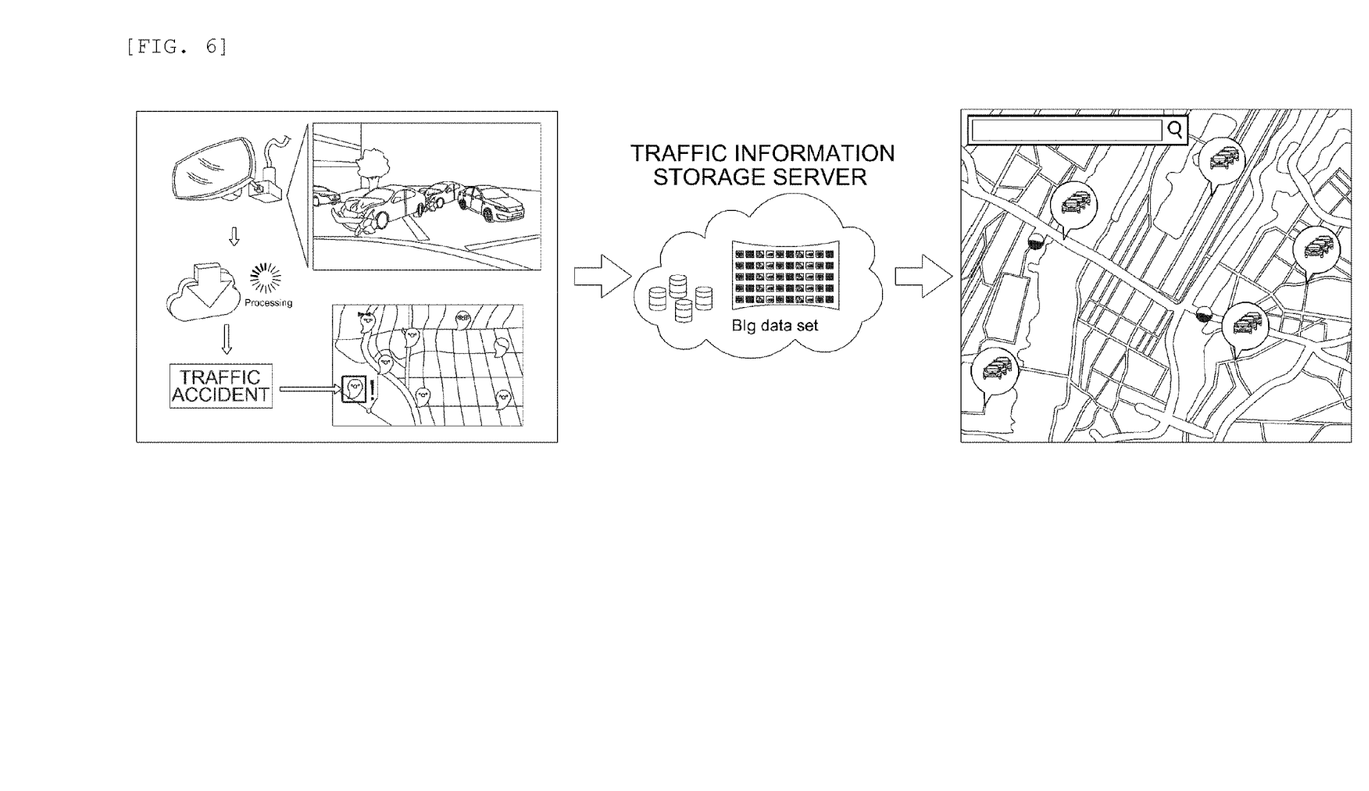
FIG. 6 is a view provided to explain a method for collecting and sharing traffic information according to still another exemplary embodiment of the present disclosure.

FIG. 6 is a view provided to explain a method for collecting and sharing traffic information according to still another exemplary embodiment of the present disclosure.

Referring to FIG. 6, the traffic information storage server displays the situation analysis information transmitted from the traffic information collecting apparatus on a map through a web page or a separate application to provide a real-time traffic information service.

In this case, since the traffic information storage server provides a service that automatically displays a plurality of transmitted situation analysis information on the map on the web page or the application, the user may consistently and conveniently obtain the traffic information for a desired area.

In this case, the web page is a general term of a web document accessible by a general purpose web browser and the application may be software which is manufactured to be used in a smart device such as a smart phone or a tablet or a computer such as a notebook computer or a desktop computer.

Figure 7:
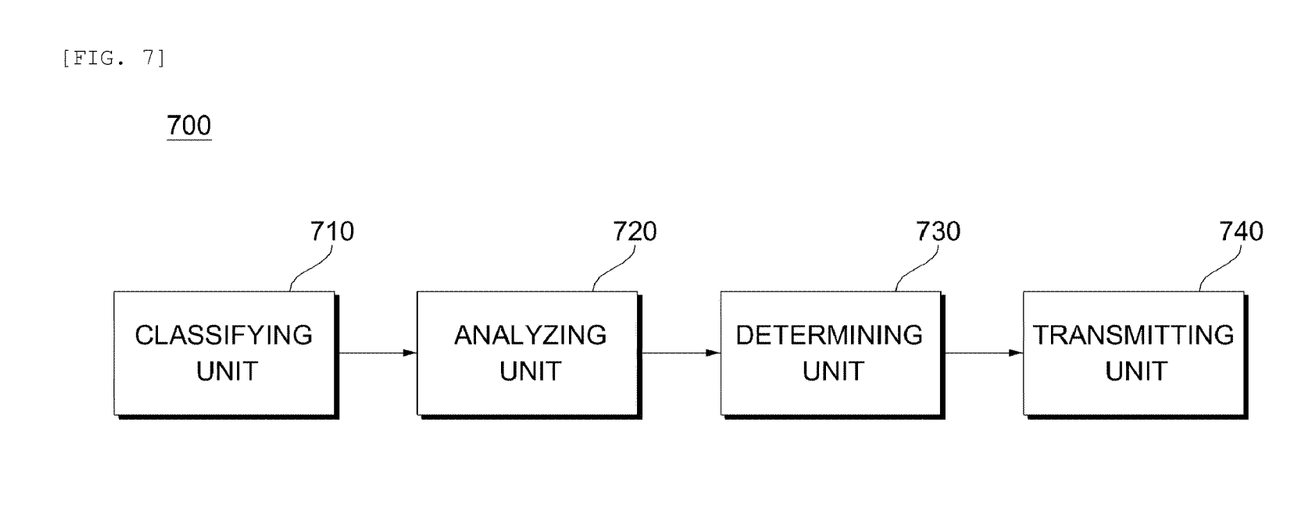
FIG. 7 is a view provided to explain a traffic information collecting apparatus using big data of an outside image of a vehicle according to an exemplary embodiment of the present disclosure.

FIG. 7 is a view provided to explain a traffic information collecting apparatus using big data of an outside image of a vehicle according to an exemplary embodiment of the present disclosure.

Referring to FIG. 7, a traffic information collecting apparatus 700 using big data of an outside image of a vehicle according to an exemplary embodiment of the present disclosure includes a classifying unit 710, an analyzing unit 720, a determining unit 730, and a transmitting unit 740. Further, the traffic information collecting apparatus 700 may further selectively include an obtaining unit (not illustrated) and a pre-processing unit (not illustrated). In the meantime, the traffic information collecting apparatus 700 may be mounted in a driver information system of a vehicle, a black box (an image recording device) for a vehicle, a smart phone, a tablet, or a computer.

The classifying unit 710 generates object classification information indicating information on at least one of a position, a type, and a status of at least one object included in an image obtained by photographing an external situation of a vehicle.

According to another exemplary embodiment, the classifying unit 710 may generate object classification information based on a deep learning algorithm.

The analyzing unit 720 analyzes the situation analysis information which is information obtained by analyzing an external situation of the vehicle, based on the object classification information.

According to another exemplary embodiment, the situation analysis information may include information on at least one of a type, a cause, details, an image, an expected duration, and a place of occurrence of the external situation.

The determining unit 730 determines whether the situation analysis information corresponds to a passage interruption event which is an incident interrupting passage of the vehicle.

The transmitting unit 740 selectively transmits the situation analysis information to the server based on the determination result obtained by the determining unit 730.

The obtaining unit (not illustrated) obtains an image obtained by photographing the external situation of the vehicle from the camera mounted in the vehicle.

Finally, the pre-processing unit (not illustrated) performs a pre-processing for improving an image quality of the image. In this case, the classifying unit 710 may use the image on which the pre-processing is performed.

According to another exemplary embodiment, when the analyzing unit 720 includes a lane interruption ratio which is a ratio between the number of lanes on which the passage of the vehicle is interrupted due to the external situation and the total number of lanes and the expected duration until the external situation is settled in the situation analysis information, the determining unit 730 may determine whether the situation analysis information corresponds to the passage interruption event based on at least one of the lane interruption ratio and the expected duration included in the situation analysis information.

According to another exemplary embodiment, the transmitted situation analysis information is relayed to a plurality of clients which is registered in the server and may be used to search for a route of the navigation which is interlocked with each of the plurality of clients.

According to another exemplary embodiment, when the classifying unit 710 further generate facility sales information indicating real-time sales information of at least one driver's convenience facility included in the photographed image, the analyzing unit 720 generates situation analysis information which further includes the facility sales information, and the determining unit 730 further determines whether the situation analysis information includes the facility sales information, the transmitting unit 740 may transmit the situation analysis information to the server, regardless of the determination result on whether the situation analysis information corresponds to the passage interruption event, according to the determination result indicating whether the facility sales information is included.

The above-described exemplary embodiments of the present disclosure may be created by a computer executable program and implemented in a general use digital computer which operates the program using a computer readable recording medium.

The computer readable recording medium includes a magnetic storage medium (for example, a ROM, a floppy disk, and hard disk), and a storing medium such as an optical reading medium (for example, CD-ROM, a DVD).

For now, the present disclosure has been described with reference to the exemplary embodiments. It is understood to those skilled in the art that the present disclosure may be implemented as a modified form without departing from an essential characteristic of the present disclosure. Therefore, the disclosed exemplary embodiments may be considered by way of illustration rather than limitation. The scope of the present disclosure is presented not in the above description but in the claims and it may be interpreted that all differences within an equivalent range thereto may be included in the present disclosure.

What is claimed is:

1. A traffic information collecting method using big data of an outside image of a vehicle, the method comprising:
   performing, by a computer, image processing to transform an image obtained by photographing an external situation of a vehicle into an enhanced image with an improved quality;
   generating, by a computer, object classification information indicating information on at least one of a position, a type, and a status of at least one object included in the enhanced image;
   generating, by the computer, situation analysis information which is information obtained by analyzing the external situation of the vehicle, based on the object classification information; and
   selectively transmitting, by the computer, the situation analysis information to a server based on whether the situation analysis information corresponds to a passage interruption event which is an incident interrupting passage of the vehicle;
   wherein when in the generating of situation analysis information, a lane interruption ratio which is a ratio between the number of lanes on which the passage of the vehicle is interrupted due to the external situation and the total number of lanes and an expected duration until the external situation is settled are included in the situation analysis information,
   in the selectively transmitting of the situation analysis information to a server, it is determined whether the situation analysis information corresponds to the passage interruption event based on at least one of the lane interruption ratio and the expected duration included in the situation analysis information.

2. The traffic information collecting method according to claim 1, wherein the generating of object classification information is performed based on a deep learning algorithm.

3. The traffic information collecting method according to claim 1, wherein the situation analysis information includes information on at least one of a type, a cause, contents, an image, an expected duration, and a place of occurrence of the external situation.

4. The traffic information collecting method according to claim 1, further comprising:
   obtaining the image obtained by photographing an external situation of the vehicle from a camera mounted in the vehicle.

5. The traffic information collecting method according to claim 1, wherein the transmitted situation analysis information is relayed to a plurality of clients registered in the server to be used to search for a route of a navigation interlocked with each of the plurality of clients.

6. The traffic information collecting method according to claim 5, wherein with regard to the situation analysis information, a reliability of the situation analysis information is determined based on the number of times that the situation analysis information for the same external situation occurring at the same place is transmitted to the server.

7. The traffic information collecting method according to claim 1, wherein when in the generating of object classification information, facility sales information indicating real-time sales information of at least one driver's convenience facility included in the image is further generated and in the generating of situation analysis information, the situation analysis information which further includes the facility sales information is generated,
   in the selectively transmitting of the situation analysis information to a server, when the situation analysis information includes the facility sales information, the situation analysis information is transmitted to the server regardless of whether the situation analysis information corresponds to the passage interruption event.

8. A traffic information collecting apparatus using big data of an outside image of a vehicle, the apparatus comprising:
a computer; and
a computer-executable program causing the computer to execute the steps of:
performing image processing to transform an image obtained by photographing an external situation of a vehicle into an enhanced image with an improved quality;
generating object classification information indicating information on at least one of a position, a type, and a status of at least one object included in the enhanced image;
generating situation analysis information which is information obtained by analyzing the external situation of the vehicle, based on the object classification information;
determining whether the situation analysis information corresponds to a passage interruption event which is an incident interrupting passage of the vehicle; and
selectively communicating the situation analysis information to a server based on a determination result;
wherein when in the generating situation analysis information, a lane interruption ratio which is a ratio between the number of lanes that the passage of the vehicle is interrupted due to the external situation and the total number of lanes and an expected duration until the external situation is settled in the situation analysis information, the computer determines whether the situation analysis information corresponds to the passage interruption event based on at least one of the lane interruption ratio and the expected duration included in the situation analysis information.

9. The traffic information collecting apparatus according to claim 8, wherein the computer-executable program further causes the computer to generate the object classification information based on a deep learning algorithm.

10. The traffic information collecting apparatus according to claim 8, wherein the situation analysis information includes information on at least one of a type, a cause, details, an image, an expected duration, and a place of occurrence of the external situation.

11. The traffic information collecting apparatus according to claim 8, wherein the computer-executable program further causes the computer to:
obtain the image obtained by photographing an external situation of the vehicle from a camera mounted in the vehicle.

12. The traffic information collecting apparatus according to claim 8, wherein the transmitted situation analysis information is relayed to a plurality of clients registered in the server to be used to search for a route of a navigation interlocked with each of the plurality of clients.

13. The traffic information collecting apparatus according to claim 8, wherein when the computer-executable program further causes the computer to
generate facility sales information indicating real-time sales information of at least one driver's convenience facility included in the image,
generate the situation analysis information which further includes the facility sales information,
determine whether the situation analysis information includes the facility sales information,
communicate the situation analysis information to the server regardless of the determination result on whether the situation analysis information corresponds to the passage interruption event, according to the determination result on whether the facility sales information is included.

* * * * *